(12) United States Patent
Herle

(10) Patent No.: US 6,907,278 B2
(45) Date of Patent: Jun. 14, 2005

(54) APPARATUS AND METHOD FOR MEASURING POWER USAGE IN A WIRELESS MOBILE STATION

(75) Inventor: Sudhindra P. Herle, Plano, TX (US)

(73) Assignee: Samsung Electronics Co., Ltd., Suwon (KR)

(*) Notice: Subject to any disclaimer, the term of this patent is extended or adjusted under 35 U.S.C. 154(b) by 408 days.

(21) Appl. No.: 10/243,600

(22) Filed: Sep. 13, 2002

(65) Prior Publication Data
US 2004/0204172 A1 Oct. 14, 2004

(51) Int. Cl.[7] .............................................. G06F 12/06
(52) U.S. Cl. .................... 455/572; 455/343.5; 455/574; 455/67.11; 455/343.6; 455/558
(58) Field of Search ................. 455/572, 574, 455/343.5, 425, 67.11, 343.6, 127.1, 128, 558

(56) References Cited

U.S. PATENT DOCUMENTS

| 5,623,533 | A | * | 4/1997 | Kikuchi et al. ............ 455/572 |
| 5,650,669 | A | * | 7/1997 | Aldous ........................ 307/66 |
| 5,651,052 | A | * | 7/1997 | Serrano ...................... 455/567 |
| 5,729,589 | A | * | 3/1998 | Samson .................... 379/32.04 |
| 5,786,789 | A | * | 7/1998 | Janky ....................... 342/357.1 |
| 6,263,200 | B1 | * | 7/2001 | Fujimoto ................. 455/343.5 |
| 6,345,180 | B1 | * | 2/2002 | Reichelt ................... 455/404.1 |
| 6,831,464 | B2 | * | 12/2004 | Yang ......................... 324/426 |
| 2001/0023176 | A1 | * | 9/2001 | Talvitie et al. ............ 455/67.4 |

* cited by examiner

Primary Examiner—Nick Corsaro
Assistant Examiner—Shaima Q. Aminzay

(57) ABSTRACT

A power monitoring device for use in an electronic device that operates in a low power mode from a removable battery module. The power monitoring device comprises a module that attaches to the electronic device in place of the battery module. The module has first battery contacts for interfacing with second battery contacts disposed in the electronic device. Attachment of the module causes the electronic device to operate in the low power mode. The power monitoring devices also comprises power supply circuitry for providing a supply voltage substantially similar to a voltage level provided by the removable battery module, and power measurement circuitry for measuring a power level supplied by the power supply circuitry.

22 Claims, 2 Drawing Sheets

APPARATUS AND METHOD FOR MEASURING POWER USAGE IN A WIRELESS MOBILE STATION

TECHNICAL FIELD OF THE INVENTION

The present invention is directed to apparatuses and methods for testing the power consumption of a wireless mobile station and, in particular, to a battery replacement module for testing the power consumption of a mobile phone.

BACKGROUND OF THE INVENTION

The manufacturers of wireless mobile stations, especially cellular telephones, continually try to improve the reliability and performance of wireless products in order to create new markets and to expand existing markets. One very important performance characteristic of wireless mobile stations is power consumption. The users of wireless mobile stations value mobility and therefore place great importance on a long battery life. For example, cell phone users prefer to spend as little time as possible charging their cell phones and prefer cell phones that can operate for long durations before recharging. The same is true for users of laptop computers operating over a wireless network.

A wireless mobile station that has high power (i.e., high current) consumption can operate on battery power only for relatively short durations and must be recharged frequently. To extend battery life, manufacturers have worked both on improving battery capacity and on reducing the power consumption of wireless mobile stations. However, accurately determining the average time between recharges for a wireless mobile station is a complicated task due to fluctuations in power consumption caused by environmental conditions and the functions being performed by the mobile station.

Thus, accurate determination of power consumption (i.e., current drain) involves extensive testing of wireless mobile stations under varying conditions and while performing different types of tasks. These test are used to determine, among other things:

1) maximum battery life;
2) average battery life;
3) sleep mode power characteristics (e.g., wake-up time upon receiving a page);
4) standby mode, talk time; and
5) current drain during specific operations (e.g., sending e-mails, answering a call, and the like).

However, simply connecting a wireless mobile station to an external power cord and measuring the current drain in the power cord is an inaccurate method for determining true power consumption. This is because many wireless mobile stations operate differently (and therefore have a different current drain) when attached to an external power supply. When the wireless mobile station detects power from an external supply, the mobile station usually operates in a "high power" mode that provides better signal reception and transmission at the expense of higher power consumption.

However, when the external power source is removed and the mobile station operates only from its own battery, the mobile station may operate in a low power mode that saves power in a number of ways. For instance, a cell phone that is not in use may operate in a slotted mode of operation in which the cell phone cycles power one and off to some of its internal components. For instance, the cell phone may apply power to its receiver for one quarter of a second and may remove power to its receiver for three quarters of a second (25% duty cycle). The cell phone can only detect incoming calls during the time when power is applied to the receiver, but power consumption is reduced 75% in the receiver.

As a result, measuring current drain from an external power source does not provide an accurate assessment of power consumption because the cell phone does not operate in a low power mode. To compensate for this, some manufacturers have implemented intrusive means of measuring current consumption, such as altering the circuitry of the wireless mobile station to include test leads that can be connected to a suitable measuring device. However, such intrusive methods are not preferred because the required circuit alterations are of a delicate nature and are not robust. This makes field-testing a mobile station difficult. Also, such alterations would only be made on a small sample of wireless mobile stations, not all such devices. Thus, it is not useful for testing any mobile station at random.

Therefore, there is a need for improved apparatuses and methods for testing the power consumption (i.e., current drain) of a wireless mobile station. In particular, there is a need for a non-intrusive apparatus for performing power consumption tests in a wireless mobile station.

SUMMARY OF THE INVENTION

The present invention is a power monitor module that provides more accurate and convenient testing of a mobile station during its normal operating mode of operation and in particular, during its low power (or power saving) mode of operation. The power monitor module "spoofs" the appearance of a battery module of a wireless mobile station, thereby causing the mobile station to operate as if the mobile station is operating only from battery power.

To address the above-discussed deficiencies of the prior art, it is a primary object of the present invention to provide a power monitoring device for use in an electronic device capable of operating in a low power mode from a removable battery module. According to an advantageous embodiment of the present invention, the power monitoring device comprises: 1) a module capable of being attached to the electronic device in place of the battery module, the module having first battery contacts thereon capable of interfacing with second battery contacts disposed in the electronic device, wherein attachment of the module enables the electronic device to operate in the low power mode; 2) power supply circuitry capable of providing to the first battery contacts a supply voltage substantially similar to a voltage level provided by the removable battery module; and 3) power measurement circuitry capable of measuring a power level supplied by the power supply circuitry to the electronic device.

According to one embodiment of the present invention, the power measurement circuitry comprises a load resistor through which a power supply current of the electronic device flows.

According to another embodiment of the present invention, the power measurement circuitry further comprises a sampling circuit for sampling a voltage across the load resistor caused by the power supply current of the electronic device.

According to still another embodiment of the present invention, the power measurement circuitry further comprises a microcontroller for reading the sampled voltage from the sampling circuit.

According to yet another embodiment of the present invention, the microcontroller calculates at least one power parameter from a plurality of sampled voltages read from the sampling circuit.

According to a further embodiment of the present invention, the microcontroller transfers the sampled voltage or at least one power parameter to an external testing device.

According to a still further embodiment of the present invention, the microcontroller stores the sampled voltage or at least one power parameter in a random access memory coupled to the microcontroller.

According to a yet further embodiment of the present invention, the microcontroller displays the sampled voltage or at least one power parameter on a display devices associated with the power monitoring device.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless mobile station.

Figure 1:
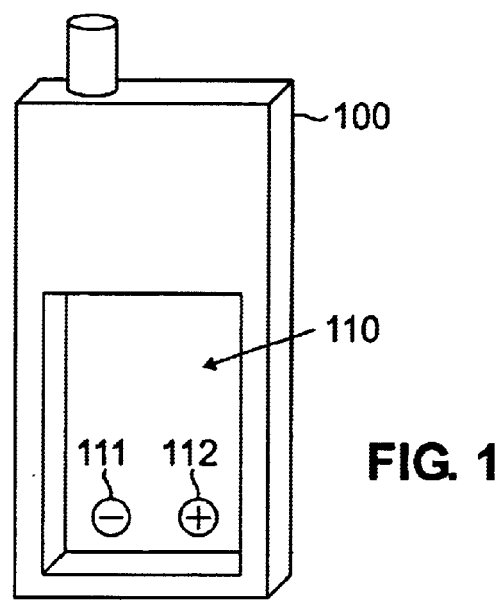
FIG. 1 is a rear view of a conventional wireless mobile station with the battery module removed.

FIG. 1 is a perspective view of the back of conventional wireless mobile station 100 with the battery module (not shown) removed from battery compartment 110. In the illustrated embodiment, wireless mobile station 100 is a cellular phone. However, this should not be construed to limit the operation of the present invention. In general, the present invention may be implemented in any type of portable device, including a laptop computer, an electronic organizer, or the like.

Visible within battery compartment 110 are negative battery contact 111 and positive battery contact 112. During normal operation, when a battery module is installed, contacts on the battery module touch against negative battery contact 111 and positive battery contact 112 to supply power to wireless mobile station 100. However, if an external power supply, such as a battery recharger, is plugged into mobile station 100, mobile station 100 will detect power from its external jack (not shown) and draws current from the external power supply instead of the battery module. At the same time, mobile station 100 typically switches to a high power mode that draws a greater amount of current than when mobile station 100 operates solely from its battery module.

Figure 2:
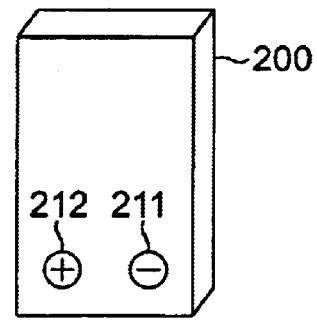
FIG. 2 is a first perspective view of a power monitor module suitable for replacing the battery module of the conventional wireless mobile station in FIG. 1 according to one embodiment of the present invention.

FIG. 2 is a first perspective view of power monitor module 200, which is suitable for replacing the battery module of conventional wireless mobile station 100 according to one embodiment of the present invention. The surface of power monitor module 200 shown in FIG. 2 is the inner surface that faces into battery compartment 110 of mobile station 100. Negative battery contact 211 and positive battery contact 212 are disposed on the inner surface of power monitor module 200.

When power monitor module 200 is inserted into compartment 110 of mobile station 100, negative battery contact 211 contacts negative battery contact 111 and positive battery contact 212 contacts positive battery contact 112. In this way, power may be supplied to mobile station 100 through power monitor module 200. Moreover, if no other external power is supplied, mobile station 100 will detect power only from inserted power monitor module 200, which appears to mobile station 100 to be nothing more than a battery module.

Mobile station 100 can operate in a power saving mode to conserve battery power if a number of conditions are true. These conditions include: 1) the absence of an external power supply connected to mobile station 100; 2) mobile station 100 is not operating in slotted mode; 3) a battery supply is present; and 4) other conditions may be applicable. However, assuming conditions 1) and 2) are true, as well as any other necessary conditions, the presence of power monitor module 200 enables mobile station 100 to operate in a power saving mode to conserve battery power.

Figure 3:
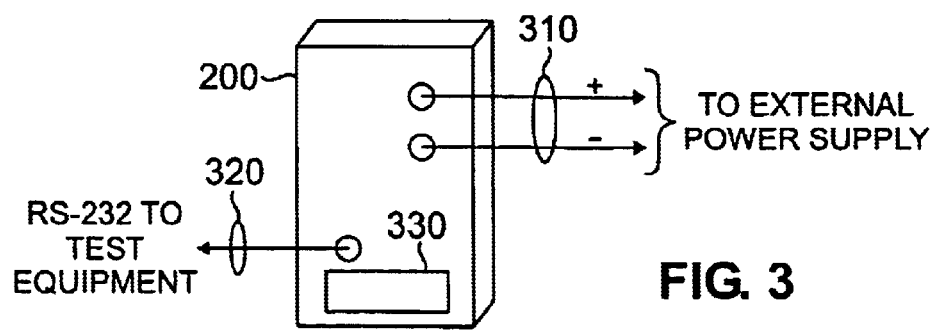
FIG. 3 is a second perspective view of the power monitor module in FIG. 2 according to one embodiment of the present invention.

FIG. 3 is a second perspective view of power monitor 200 according to one embodiment of the present invention. The surface of power monitor module 200 shown in FIG. 3 is the outer surface that faces out of battery compartment 110 of mobile station 100. Power monitor module 200 receives external power via power cord 310. Power monitor module 200 may transmit and receive data and commands via communication line 320, which may be, for example, an RX-232 cable connected to external test equipment or a personal computer (PC). Optionally, power monitor module 200 may include display 330 for displaying measured power (i.e., current) values recorded by power monitor module 200.

Figure 4:
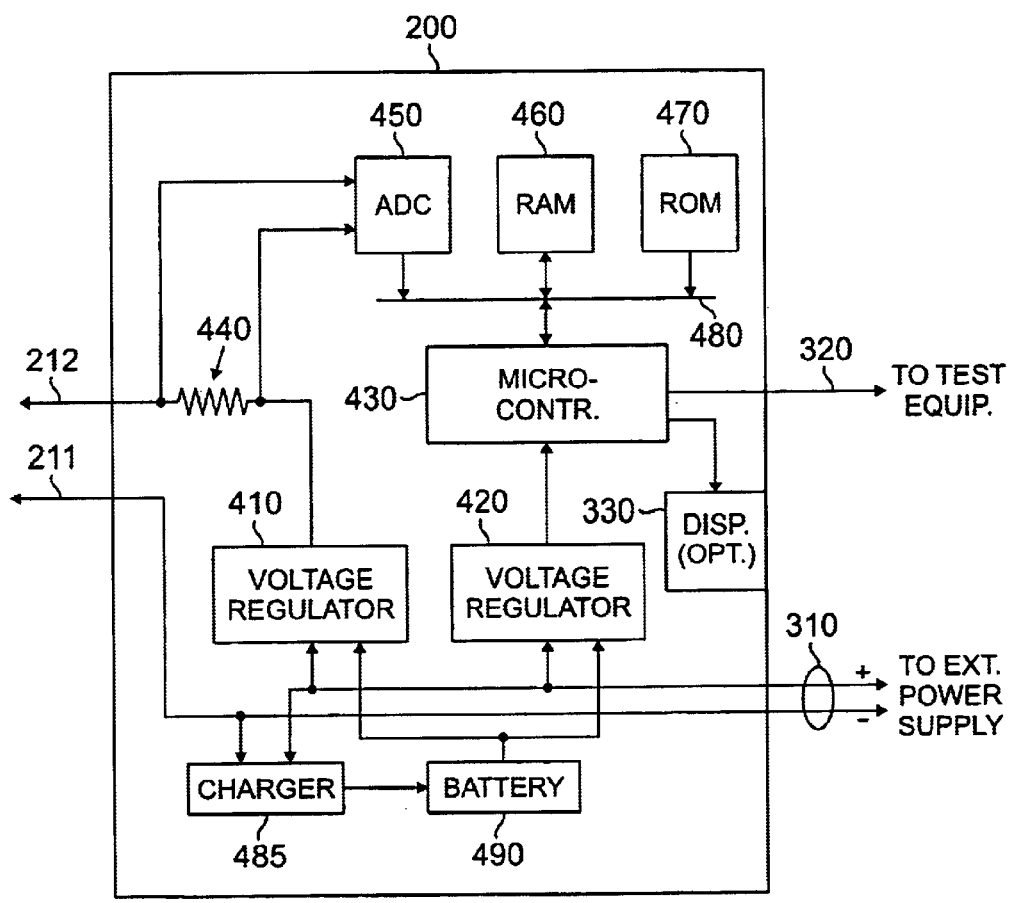
FIG. 4 illustrates the testing circuitry in the power monitor module depicted in FIGS. 3 and 4 according to one embodiment of the present invention.

FIG. 4 illustrates the testing circuitry in power monitor module 200 according to one embodiment of the present invention. Power monitor module 200 comprises voltage regulator 410, voltage regulator 420, microcontroller 430, load resistor 440, analog-to-digital converter (ADC) 450, random access memory (RAM) 460, and read-only memory (ROM) 470. Microcontroller 430, ADC 450, RAM 460, and ROM 470 are coupled by, and communicate across, communication bus 480. Optionally, power monitor module 200 may also comprise charger 485 and battery 490.

According to one embodiment of the present invention, external power may be supplied to voltage regulator 410 via power cord 310. Voltage regulator 410 converts the external power to the voltage level normally produced by a battery module inserted into mobile station 100. For example, the output of voltage regulator 410 may be +3.6 volts. The battery-level output is coupled to positive contact 212 via load resistor 440. Negative battery contact 212 is coupled to the negative reference (i.e., ground) of the external power supply.

Load resistor 200 is a very small (e.g., 0.1 ohms) and very precise (e.g., +/−0.1%) load that is used to measure the current flowing from voltage regulator 410 into mobile station 100 via positive battery contact 212. The load current into mobile station 100 creates a voltage across load resistor 200 that is continually sampled by ADC 450. Microcontroller 430 reads the voltage values sampled by ADC 450 and uses the sample values to determine the power consumption of mobile station 100 under various conditions and during the execution of different tasks.

Microcontroller 430 executes a control program stored in ROM 470 and uses RAM 460 as a scratchpad to store intermediate calculations and, if necessary, to store sampled voltages and/or final calculations. According to an exemplary embodiment of the present invention, RAM 460 may be a non-volatile memory, such as a flash RAM. If microcontroller 430 is coupled to an external test control device (e.g., a PC) via communication line 320, microcontroller 430 may transfer the sampled voltage values directly to the external test control device. Alternatively, microcontroller 430 may calculate important parameters, such as the average value, or the peak value, over a selected time period, and transfer only the important parameters to the external test control device. If microcontroller 430 is not coupled to an external test control device, microcontroller 430 may instead transfer the sampled voltage values or the important parameters to display 330 for subsequent display to a user of mobile station 100.

Optional charger 485 and battery 490 may be implemented in order to field test the power consumption of mobile station 100. Charger 485 charges battery 490 during time periods when power cord 310 connects power monitor module 200 to an external supply. When power cord 310 is disconnected, battery 490 provides temporary internal power to voltage regulator 410 and voltage regulator 420.

This enables power monitor module 200 to continue to operate as described above, except without external power. Thus, the user of mobile station 100 is free to move around while testing the power consumption of mobile station 100. Power sample values and important parameters may then be displayed on display 330 or may be stored in RAM 460 for later retrieval via communication line 320.

Advantageously, the external power for power monitor module 200 may be supplied via power cord 301 from an actual battery that is compatible with mobile station 100. Such a configuration permits power monitor module 200 to accurately characterize the external battery as well as mobile station 100 under a realistic load (i.e., mobile station 100). Power monitor module 200 would monitor power consumption on mobile station 100 and voltage on the external battery.

Although the present invention has been described in detail, those skilled in the art should understand that they may make various changes, substitutions and alterations herein without departing from the spirit and scope of the invention in its broadest form.

What is claimed is:

1. For use in an electronic device capable of operating in a low power mode from a removable battery module, a power monitoring device comprising:

a module capable of being attached to said electronic device in place of said battery module, said module having first battery contacts thereon capable of interfacing with second battery contacts disposed in said electronic device;

power supply circuitry disposed in said module capable of providing to said first battery contacts a first supply voltage substantially similar to a voltage level provided by said removable battery module, wherein attachment of said module causes said electronic device to detect said first supply voltage and enables said electronic device to operate in said low power mode; and power measurement circuitry disposed in said module capable of measuring a power level supplied by said power supply circuitry to said electronic device.

2. The power monitoring device as set forth in claim 1 wherein said power measurement circuitry comprises a load resistor through which a power supply current of said electronic device flows.

3. The power monitoring device as set forth in claim 2 wherein said power measurement circuitry further comprises a sampling circuit for sampling a voltage across said load resistor caused by said power supply current of said electronic device.

4. The power monitoring device as set forth in claim 3 wherein said power measurement circuitry further comprises a microcontroller for reading said sampled voltage from said sampling circuit.

5. The power monitoring device as set forth in claim 4 wherein said microcontroller transfers said sampled voltage to an external testing device.

6. The power monitoring device as set forth in claim 4 wherein said microcontroller stores said sampled voltage in a random access memory coupled to said microcontroller.

7. The power monitoring device as set forth in claim 4 wherein said microcontroller displays said sampled voltage on a display device associated with said power monitoring device.

8. The power monitoring device as set forth in claim 4 wherein said microcontroller calculates at least one power parameter from a plurality of sampled voltages read from said sampling circuit.

9. The power monitoring device as set forth in claim 8 wherein said microcontroller transfers said at least one power parameter to an external testing device.

10. The power monitoring device as set forth in claim 8 wherein said microcontroller stores said at least one power parameter in a random access memory coupled to said microcontroller.

11. The power monitoring device as set forth in claim 8 wherein said microcontroller displays said at least one power parameter on a display device associated with said power monitoring device.

12. The power monitoring device as set forth in claim 1 wherein said power supply circuitry comprises a voltage regulator capable of receiving a main power supply voltage and generating therefrom said first supply voltage.

13. The power monitoring device as set forth in claim 12 wherein said main power supply voltage is received from an external source.

14. The power monitoring device as set forth in claim 12 wherein said power supply circuitry comprises an internal battery capable of supplying said main power supply voltage to said voltage regulator.

15. The power monitoring device as set forth in claim 14 wherein said power supply circuitry further comprises a battery charger capable of receiving said main power supply voltage and charging said internal batter.

16. A method of monitoring power consumption of an electronic device capable of operating in a low power mode from a removable battery module, the method comprising the steps of:
   attaching a power monitor module to the electronic device in place of the battery module, wherein the power monitor module has first battery contacts thereon capable of interfacing with second battery contacts disposed in the electronic device;
   in the power monitor module, providing to the first battery contacts a first supply voltage substantially similar to a voltage level provided by the removable battery module, wherein attachment of the power monitor module causes the electronic device to detect the first supply voltage and enables the electronic device to operate in the low power mode; and
   in the power monitor module, measuring a power level supplied by the power supply circuitry to the electronic device.

17. The method as set forth in claim 16 wherein the power measurement circuitry comprises a load resistor through which a power supply current of the electronic device flows.

18. The method as set forth in claim 17 wherein the step of measuring the power level comprises the step of sampling a voltage across the load resistor caused by the power supply current of the electronic device.

19. The method as set forth in claim 18 further comprising the step of calculating at least one power parameter from a plurality of sampled voltages sampled across the load resistor.

20. The method as set forth in claim 19 further comprising the step of transferring one of the sampled voltage and the at least one power parameter to an external testing device.

21. The method as set forth in claim 19 further comprising the step of storing one of the sampled voltage and the at least one power parameter in a random access memory of the power monitoring module.

22. The method as set forth in claim 19 further comprising the step of displaying one of the sampled voltage and the at least one power parameter in a display of the power monitoring module.

* * * * *